Patented Aug. 8, 1933

1,921,137

UNITED STATES PATENT OFFICE 1,921,137

COMPOSITION FOR TREATING WATER USED IN AIR CONDITIONING APPARATUS AND THE LIKE

Morris Schlissel, Brooklyn, N. Y., assignor to Cosmopolitan Chemical Co. Inc., Long Island City, N. Y., a Corporation of New York No Drawing. Application February 3, 1932
Serial No. 590,678

2 Claims. (Cl. 87—27)

This invention relates to a composition of matter adapted to prevent and eliminate corrosion, congestion and rust in humidifiers, washers, cooling towers, etc.

It has been found in practice to effectually overcome the detrimental effects incident to the use of impure water, e.g., in air conditioning equipment. It is well known that natural waters contain various dissolved salts and gases, such as calcium and magnesium compounds and carbon dioxide. The salts tend to form congestion and scale in metallic apparatus in which they may be employed, while the carbon dioxide forms acids which tend to accelerate corrosion and pitting of the metals. When natural waters are exposed to the action of atmospheric air, such, for example, as in air conditioning systems, these waters are apt to and generally do absorb impurities from the air which have further and even more serious detrimental effects upon metallic apparatus. For example, the air may be polluted by smoke containing carbon dioxide, carbon monoxide, nitrogen oxides, ammonia, sulphur, etc., which when acted upon by the water, produce acids and other substances which are extremely corrosive in their nature.

As a result of the use of water polluted in the manner described, it has been found in practice that it is extremely difficult to maintain apparatus in proper operative condition and to preclude rapid deterioration thereof resulting from corrosion, pitting, congestion, rust, etc.

I have discovered that it is possible to substantially neutralize the effect of such polluted waters upon metallic apparatus through the employment of the composition of matter of this invention and practice has fully demonstrated that when the composition of matter of this invention is used in solution in the waters employed in humidifiers, washers, cooling towers, etc., corrosion, rust and other detrimental effects heretofore universally prevalent are reduced to such negligible character as to be practically nil. The apparatus after a long use does not show any appreciable effects with this treatment and such treatment does not in any way interfere with the proper functioning of the apparatus.

Speaking generally, the composition of this invention consists in the combination of various chemical constituents which, through their interaction, together with their action upon the water and air which they are adapted to treat, the acids are neutralized and the salts are precipitated out, so as to produce a condition practically harmless to the metal of the apparatus.

When using the invention in washers, scrubbers and similar apparatus where the water is sprayed, the metal portions of the apparatus are protected by the impingement of the water containing the material of this invention in solution, and this solution forms a protective film over the metal. The film is constantly changing in its nature for as the solution is sprayed on to the surface, it flows downwardly and is carried off at the outlet. In any event, the film is a protective film and corrosive air, gases or other material that may enter the treating chamber are precluded from exercising a corrosive or otherwise detrimental effect upon the metals of such chamber.

When the chemical composition of this invention is used in solution in water circulated through pipes or conduits, the surfaces of the pipe exposed to such water are also protected by a treatment of the water as will be clearly apparent.

The composition of this invention comprises the following ingredients: water, caustic soda, sodium bichromate, soda ash, di-sodium phosphate, sodium silicate, tannin.

In preparing the composition, the procedure is to add the various ingredients in the order above given, that is to say, water is first introduced in a quantity, for example, approximating 6.78 per cent of the entire batch in order to offer a medium of solution for as much as possible of the sodium hydroxide, di-sodium phosphate, sodium bi-chromate and soda ash. For example, I may add approximately 1.45 per cent sodium hydroxide, 1.63 per cent di-sodium phosphate, 1.16 per cent sodium bichromate and 2.90 per cent sodium carbonate or soda ash. Complete solution does not take place as I purposely use an insufficient amount of water to provide for complete solution. A considerable amount of the solid material remains in the form of a mush.

After the materials are added to the water, the following re-actions take place; first, the sodium hydroxide reacts with the sodium bichromate to convert the sodium bichromate into sodium chromate, and, second, the sodium hydroxide further reacts with the di-sodium phosphate to convert it into tri-sodium phosphate. The material in the form of a mush or liquid may be packaged in this form in suitable containers for shipment to the point of use. In practice, the amount of material used to a particular quantity of water will depend upon the condition of the water and the particular use to which the water is to be put. In air conditioning systems, for example, water may be initially charged with a quantity of the material and additional quantities of the material may be added from time to time or at stated intervals to maintain the water in the desired condition. For example, an initial charge may consist in approximately one quart of the material to approximately one thousand gallons of material daily or weekly as may be necessary to keep the water in proper condition.

In the use of this solution, the constituents thereof function in substantially the following manner.

Sodium hydroxide produces a desired excess alkalinity and prevents the developent of an acidic condition in a system in which the solution is used. In other words, it serves to neutralize acids present in the water of the solution and also in air treated in the system if the material is being used in an air conditioning installation. For the purpose of example, I may state that I have used to advantage in this connection what is commercially known as 76 per cent caustic soda. The function of the sodium hydroxide is therefore to neutralize the acids present and by thus limiting and preventing excess acidity to prevent or minimize the corrosive effect of residual acids.

Sodium bi-chromate used in practice is preferably of a technical grade having the formula $Na_2Cr_2O_7.2H_2O$. This material contains water of crystallization. As hereinbefore stated, the sodium bi-chromate employed is converted into sodium chromate having a formula $Na_2CrO_4$ and both the sodium chromate and the sodium dichromate are used for their pacifying and inhibiting actions. In the form of the sodium chromate the material acts as hereinbefore indicated and also has a pronounced free alkalinity which will react with any acidity present in the water or in the air or developed or produced therein by the normal operation of the apparatus. The reaction with any acidity will reverse the change from the dichromate to the chromate and cause the chromate to be reconverted into the di-chromate. In their action as pacifiers or inhibiters, these materials form on the surface of the metal to be protected in the form of a thin practical invisible film and this film is of a protective character serving to prevent corrosion.

The sodium carbonate used may conveniently be what is commercially known as 58 per cent light soda ash and serves the purpose of continuing and completing the reactions of the sodium hydroxide with the di-sodium phosphate and the sodium bichromate. Moreover, the soda ash produces in the finished solution increased excess of alkalinity and assists the sodium hydroxide in neutralizing acids present. The soda ash finally reacts with the calcium salts present in the water under treatment to form insoluble calcium carbonate.

The di-sodium phosphate employed may conveniently be a commercial product having the formula $Na_2HPO_4.12H_2O$, embodying as will be noted water of crystallization. As hereinbefore stated, the di-sodium phosphate is converted into tri-sodium phosphate which offers to the water alkalinity necessary for the neutralization of any free or developed acidity and thus assists the other alkaline materials in neutralizing the residual acids. Furthermore, the tri-sodium phosphate reacts with the calcium and magnesium salts present in the water to form calcium and magnesium phosphate which in finely divided form are present in the protective film which covers the metallic parts of the apparatus. The formation of the film in this connection is assisted by the sodium silicate as hereinafter fully explained.

The sodium silicate used may conveniently be what is known commercially as 40° Baumé. Its analysis would show substantially a sodium oxide to silicon dioxide ratio of 1 to 3.25 and contains approximately 8.9 per cent sodium oxide, approximately 29 per cent silicon dioxide and substantially the remainder of water. Sodium silicate serves several purposes. In the first place it offers to the finished material a still further excess alkalinity, secondly, it imparts to the film a gelatinous character particularly when used in combination with the other materials which I employ, particularly in connection with the tannin. The tannin employed is preferably a chestnut bark extract, although any other commercial form of tannin product may be employed in this connection. I have used to advantage a commercial product having approximately 65 per cent tannin content which functions in the following manner.

It is first neutralized by the alkaline materials present and forms a sodium tannate which prevents precipitation of any calcium or magnesium salts in the form of hard, precipitated scale. Furthermore, it causes the calcium and magnesium salts when precipitated to come down in the form of a colloidal gel. The tannin furthermore absorbs some of the free oxygen present and thereby minimizes corrosion.

I wish to lay particular stress upon the ability of the solution which I have defined to produce a gelatinous film. This gelatinous film while relatively thin when deposited upon the walls of treating chambers and readily mobile, so that it flows off easily, is nevertheless of a relatively firm and continuous nature. The colloidal character of the solution imparts to it increased wetting power and at the same time facilitates filming on surfaces which in the absence of a gel would shed the solution without the formation of a film. It is essential for the protection of metal surfaces which are not immersed in the solution to be covered throughout with a film of the character described and experience has shown that with the solution of this invention, the film is formed throughout the entire area of such surfaces and forms an unbroken protective covering thereover. The film prevents, as will be apparent, the actual contact between the metal and untreated air or water within the chamber. Without this contact there can be no corrosion for in order to have corrosion, it is necessary to remove from the surface of the metal hydrogen which is formed on that surface. By preventing the removal of such hydrogen, corrosion is precluded. The silicious film or gel formed by the sodium silicate prevents said hydrogen removal and the sodium silicate in combination with the soda ash, caustic soda and tri-sodium phosphate precipitates from the water calcium and magnesium salts which become bound into the gel or film and impart to such film a stronger and firmer structure, the strength of which is further increased by the addition of the tannin.

I have hereinbefore described my invention as particularly used in connection with the prevention of corrosion or the depositing of rust or scale, but experience has shown that the formula given is not only effective in the prevention, but also is efficient in the elimination of any existing rust, scale or other corrosion which may be present in the apparatus prior to use of the composition of this invention. When used as a corrective, the scale and rust elimination is brought about by the alkalinity present and also by the tannin. The film produced through the employment of this invention has a pronounced tendency to form directly on metal surfaces. If any rust or scale is present on said surfaces, the material of such film penetrates through the rust or scale, and softens the same to such extent that such rust and scale is washed away from the metal by friction caused by water movement in the chamber or vessel in which the material is contained.

For the purpose of graphic description, I have found it desirable to refer to the use of the present invention particularly in connection with air conditioning systems, wherein air to be treated is passed through scrubbers. In this type of system great difficulty has heretofore prevailed due to acids and acid forming gases present in the air and water and heretofore no adequate solution has been suggested for preventing rapid deterioration of such apparatus from the causes stated. The difficulty with treating apparatus of this character is that the metal parts are not submerged, but are ordinarily free to direct action of the acids and air present. By this invention, the protective film overcomes the detrimental effects to which I have referred in an efficient and thoroughly satisfactory manner.

I wish it understood, however, that while I have described the invention in this particular commercial use that it is equally adapted for use in humidifiers, washers, cooling towers, cooling systems of Diesel engines, and any recirculating or non-recirculating water systems, where metals are subjected to the combination action of water and air to their deterioration.

The foregoing detailed description sets forth the invention in its preferred practical form, but the invention is not to be understood as restricted to precise proportions, but it to be construed as embracing equivalents within the scope of the appended claims. E. g., I may if desired use, as a hydrate of an alkaline metal, potassium hydroxide instead of sodium hydroxide.

Having thus fully described the invention, what I claim as new and desire to secure by Letters Patent is:

1. A composition to be added to water used in air conditioning apparatus for preventing corrosion, congestion and rust in said apparatus consisting of the following ingredients and their reaction products: water approximately 6.78 per cent, caustic soda approximately 1.45 per cent, sodium bichromate approximately 1.16 per cent, soda ash, approximately 2.90 per cent, di-sodium phosphate approximately 1.63 per cent, sodium silicate approximately 86.08 per cent, and tannin .006 per cent.

2. A composition to be added to water used in air conditioning apparatus for preventing corrosion, congestion and rust in said apparatus comprising the following ingredients and their reaction products: water 4 to 10 per cent, caustic soda .5 to 2 per cent, sodium bichromate .5 to 2 per cent, soda ash 1 to 5 per cent, di-sodium phosphate .5 to 2 per cent, and sodium silicate 75 to 90 per cent.

MORRIS SCHLISSEL.